US008676247B2

(12) United States Patent
Ferris et al.

(10) Patent No.: US 8,676,247 B2
(45) Date of Patent: Mar. 18, 2014

(54) METHOD AND APPARATUS FOR DYNAMICALLY DETERMINING THE SCOPE OF SERVICES FOR AN INFRASTRUCTURE DEVICE OPERATING IN LOCAL MODE

(75) Inventors: Sean M. Ferris, Jurong East (SG); Michael A. Franklin, Farnham (GB)

(73) Assignee: Motorola Solutions, Inc., Schaumburg, IL (US)

( * ) Notice: Subject to any disclaimer, the term of this patent is extended or adjusted under 35 U.S.C. 154(b) by 372 days.

(21) Appl. No.: 13/141,346

(22) PCT Filed: Dec. 17, 2009

(86) PCT No.: PCT/US2009/068554
§ 371 (c)(1),
(2), (4) Date: Aug. 25, 2011

(87) PCT Pub. No.: WO2010/075183
PCT Pub. Date: Jul. 1, 2010

(65) Prior Publication Data
US 2011/0306372 A1    Dec. 15, 2011

(30) Foreign Application Priority Data

Dec. 23, 2008    (GB) .................................. 0823490.8

(51) Int. Cl.
*H04B 7/00*    (2006.01)
(52) U.S. Cl.
USPC ........ 455/524; 455/428; 455/127.4; 455/500; 455/507

(58) Field of Classification Search
USPC .......... 455/500, 507, 420, 435.2, 452.1, 515, 455/524, 151.1, 160.1, 436, 561, 428, 455/127.4; 370/338, 351; 713/340
See application file for complete search history.

(56) References Cited

U.S. PATENT DOCUMENTS

| 6,178,327 | B1 | 1/2001 | Gomez |
| 7,162,250 | B2 | 1/2007 | Misra |
| 2002/0173275 | A1 | 11/2002 | Coutant |
| 2006/0109815 | A1* | 5/2006 | Ozer et al. ..................... 370/329 |
| 2007/0291732 | A1* | 12/2007 | Todd et al. ..................... 370/351 |
| 2009/0325494 | A1* | 12/2009 | Staszewski et al. ............. 455/43 |
| 2010/0151852 | A1* | 6/2010 | Mori et al. ..................... 455/425 |
| 2010/0250992 | A1* | 9/2010 | Iyer et al. ..................... 713/340 |

FOREIGN PATENT DOCUMENTS

| EP | 1611758 A2 | 1/2006 |
| JP | 09163443 A | 6/1997 |
| WO | 2008136416 A1 | 11/2008 |

OTHER PUBLICATIONS

Supplemental Search Report Dated Jul. 2012 for Counterpart Application EP09835650.
GB Search Report Dated Mar. 30, 2009 for Counterpart Application.
PCT International Search Report Dated Jul. 23, 2010 for Counterpart Application.

* cited by examiner

*Primary Examiner* — Tan Trinh
(74) *Attorney, Agent, or Firm* — Daniel R. Bestor

(57) ABSTRACT

A method and apparatus for dynamically determining the scope of services for a base station operating in local mode. The method includes: receiving (206) an overlap status for at least one neighboring infrastructure device; detecting (208) that the infrastructure device has switched from a wide mode of operation to a local mode of operation; and selecting (210) one of a plurality of local mode operating states, based on the received overlap status.

11 Claims, 2 Drawing Sheets

METHOD AND APPARATUS FOR DYNAMICALLY DETERMINING THE SCOPE OF SERVICES FOR AN INFRASTRUCTURE DEVICE OPERATING IN LOCAL MODE

CROSS REFERENCE TO RELATED APPLICATIONS

This application is a National Stage filing under 35 USC §371 of co-pending Patent Cooperation Treaty international application having Serial No. PCT/US09/68554 (the "PCT international application") filed on Dec. 17, 2009. This application claims priority to the PCT international application and to prior Great Britain (GB) national application having Serial No. 0823490.8 filed on Dec. 23, 2008, the priority of which was also claimed in the PCT international application. Both the PCT international application and the GB national application are assigned to MOTOROLA SOLUTIONS, Inc.

FIELD OF THE DISCLOSURE

The present disclosure relates generally to multi-site communication systems and more particularly to dynamically determining the scope of services for an infrastructure device operating in local mode.

BACKGROUND

In a multi-site communication system (for example the Terrestrial Trunked RAdio (TETRA) system), a geographical region is divided into a number of cells (or coverage areas), each of which is served by a base station. The switching infrastructure supporting the base stations (BS) (which are also referred to as base transceiver stations (BTS)) may be shared with other BS's. The switching infrastructure in a TETRA system is generally referred to as a switching and management infrastructure (SwMI). A remote unit referred to also as a subscriber, a mobile station (MS), or a communication unit is served via a radio communication link by the BS of a cell within which the remote unit is operating.

One of the basic advantages of the multi-site communication systems is that a subscriber may move from one geographical location to another one while receiving services from the network. To provide seamless service there are regions of overlapping coverage between base transceiver stations. As the subscriber moves from an area served by a first base station towards an area served by a second base station it enters the region of overlapping coverage. Within the region of overlapping coverage, the subscriber changes the serving base transceiver station. This is known as cell reselection or handover. To effectuate this cell reselection or handover, a high number of base stations are installed. Due to installation of the high number of base transceiver stations, there occurs coverage overlap between neighboring base stations.

If one of the neighboring base stations loses connectivity to the SwMI, the base stations operate in a local mode of operation. When operating in a local mode, the base stations operate according to predefined fixed instructions stored in the base stations; these instructions are usually stored in the base station at the time of network setup. However, operating according predefined instructions may not be appropriate according to the current traffic load within the cell.

Accordingly, there is a need for a method and an apparatus for dynamically determining the scope of services for a base station operating in local mode.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
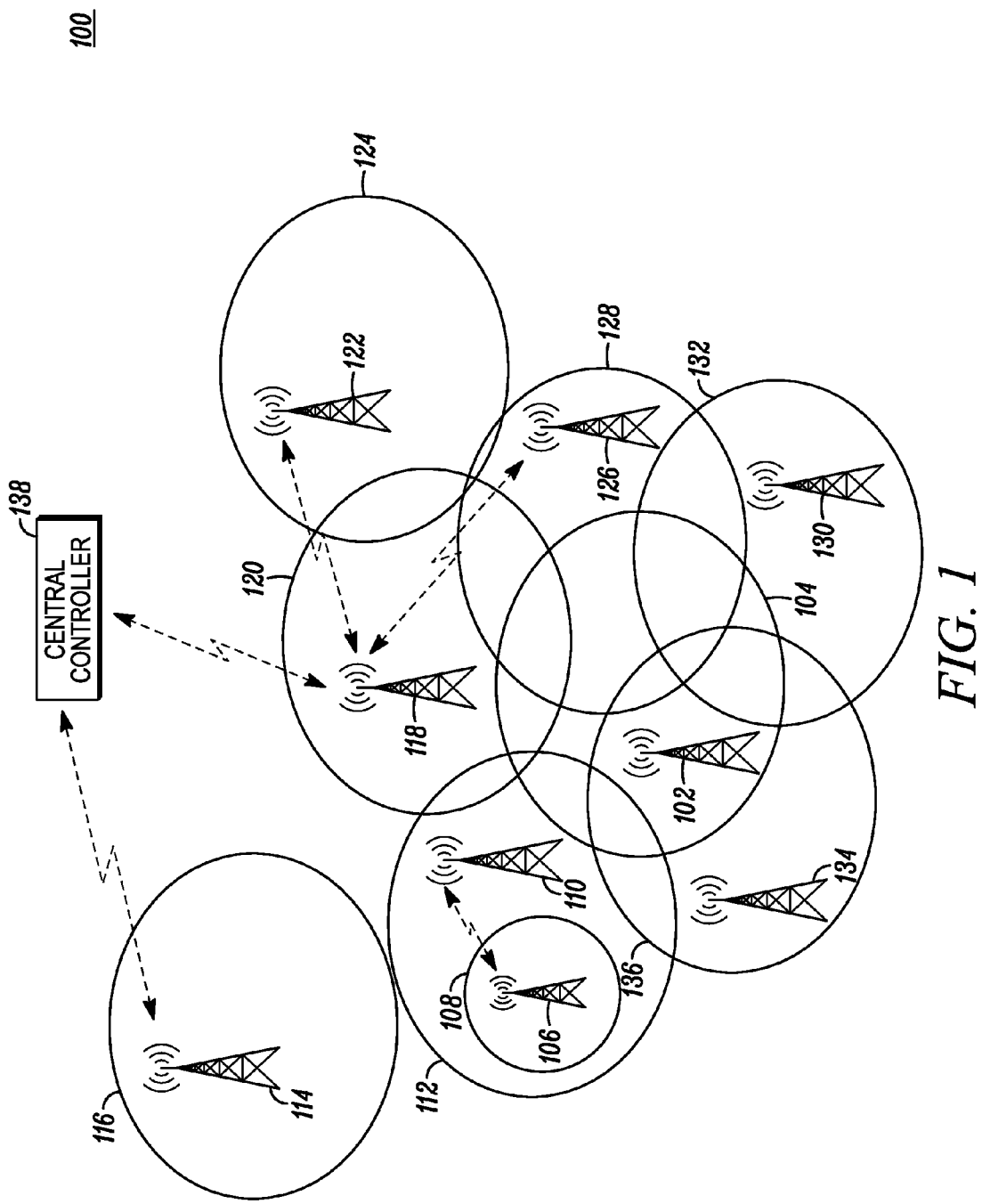
FIG. 1 is a system diagram of a multi-site communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method is described for dynamically determining the scope of services for an infrastructure device (e.g., a base station) operating in local mode. The method includes receiving an overlap status for at least one neighboring infrastructure device. Detecting that the infrastructure device has switched from a wide mode of operation to a local mode of operation. Selecting one of a plurality of local mode operating states, based on the received overlap status.

Referring now to the figures, FIG. 1 is a system diagram illustrating a multi-site communication system 100 in accordance with some embodiments. Examples of existing or proposed multi-site communication systems are TETRA, SMARTnet, Smartzone, MPT-1327, Motorola's integrated digitally enhanced network (iDEN).

As used herein, a "multi-site communication system" is a system that includes multiple infrastructure devices that are connected to a central controller, with each infrastructure device serving a coverage area, wherein there is some overlap in coverage area between the infrastructure devices. The one or more infrastructure devices communicate with each other and with wireless communication devices in the system to manage communication between the wireless communication devices. The one or more infrastructure devices operate in both a local mode and a wide mode. When the infrastructure device is communicatively connected to the central controller, it is said to be operating in wide mode. When the infrastructure device loses connectivity to the central controller, the infrastructure device switches to the local mode.

Communication system 100 is depicted in a very generalized manner. For example, communication system 100 is shown to simply include a SwMI one central controller 138 and infrastructure devices 102, 106, 110, 114, 118, 122, 126, 130, 134, within their respective network coverage areas 104, 108, 112, 116, 120, 124, 128, 132, 136. The central controller 138 is shown providing network services support to the infrastructure devices 114, 118 using wireless interfaces (illustrated by dashed lines). The wireless interfaces are in accordance with the particular access technology supported by the central controller 138 and the respective infrastructure devices. For example, all of the infrastructure devices may utilize the same access technology, or they may utilize different access technologies. Moreover, each infrastructure device includes the capability to communicate with the central controller 138 through a wired link.

The infrastructure devices also include the capability to connect directly to each other, through one or more wireless communication protocols or through a wired link. Accordingly, the infrastructure devices (and the central controller if operating wirelessly) are equipped with transceivers, memories and processing devices operatively coupled and adapted, arranged, configured, and designed to carry out their functionality, including any functionality needed to implement the teachings herein. The infrastructure devices are further equipped with any other elements needed for a commercial embodiment.

Connections are shown only between a limited number of infrastructure devices and the central controller, solely for the ease of illustration. However, in system 100, the central controller provides network services support to each of the infrastructure devices based on system requirements. Moreover, embodiments are not dependent on the applications and protocol(s) running on the devices in the system and used to facilitate communications in the system but can be used with any such applications and protocols.

As used herein, an infrastructure device is a device that is a part of a fixed network infrastructure and can receive information (either control or media, e.g., data, voice (audio), video, etc.) in a signal from a communication device and transmit information in signals to one or more wireless communication devices via a communication link (not shown). An infrastructure device includes, but is not limited to, equipment commonly referred to as PTT servers, base stations, base transceiver stations, access points, routers or any other type of infrastructure equipment interfacing a communication device in a wired or wireless environment.

As referred to herein, a communication device includes, but is not limited to, devices commonly referred to as access terminals, mobile radios, mobile stations, subscriber units, user equipment, mobile devices, or any other device capable of operating in a wired or wireless environment. Examples of communication devices include, but are not limited to, two-way radios, mobile phones, cellular phones, Personal Digital Assistants (PDAs), laptops and pagers.

For example, in this illustrative embodiment, the central controller and the infrastructure devices are implemented in a TETRA system. The TETRA communications system may be used as a public communication system. However a principal application of TETRA communication systems is for use by organizations or groups such as emergency services. Special functions and services implemented in the TETRA system make this system especially suitable for services like police, emergency, fire rescue or others. One feature provided by a TETRA communication system, which is especially useful for the emergency services, is controlling group calls as well as managing the membership of these groups. Other features and services provided by TETRA include, push-to-talk channel allocation, broadcast calls etc.

The infrastructure devices of the multi-site communication system 100 have capabilities of operating in both a wide mode of operation and a local mode of operation. The infrastructure device operates in wide mode when the infrastructure device is connected to the central controller 138. Whereas, the infrastructure device operates in the local mode of operation when the infrastructure device is disconnected from the central controller 138.

While operating in the wide mode of operation, an infrastructure device receives an overlap status for its neighboring infrastructure devices, in accordance with the teachings herein, from the central controller 138. A neighboring infrastructure device of a first infrastructure device is defined as a second infrastructure device that has overlapping coverage area with the first infrastructure device. The infrastructure device could also or alternatively receive the overlap status from its neighboring infrastructure devices.

In one embodiment, while operating in the wide mode of operation an infrastructure device also receives an operating mode of the neighboring infrastructure devices from the neighboring infrastructure devices or from the central controller 138, in accordance with the teachings herein. Each infrastructure device receives the operating mode from each of its neighboring infrastructure devices or from the central controller.

On receiving the overlap status and operating mode of the neighboring infrastructure devices, the infrastructure device updates a database maintained within the infrastructure device. At periodic intervals, the infrastructure device determines whether it has connectivity to the central controller. If the infrastructure device has connectivity to the central controller, the infrastructure devices continues to offer services in a wide mode of operation. However, if the infrastructure device has lost connectivity to the central controller, the infrastructure device operates in a local mode of operation. The operating state in local mode is further determined using the teachings herein.

Figure 2:
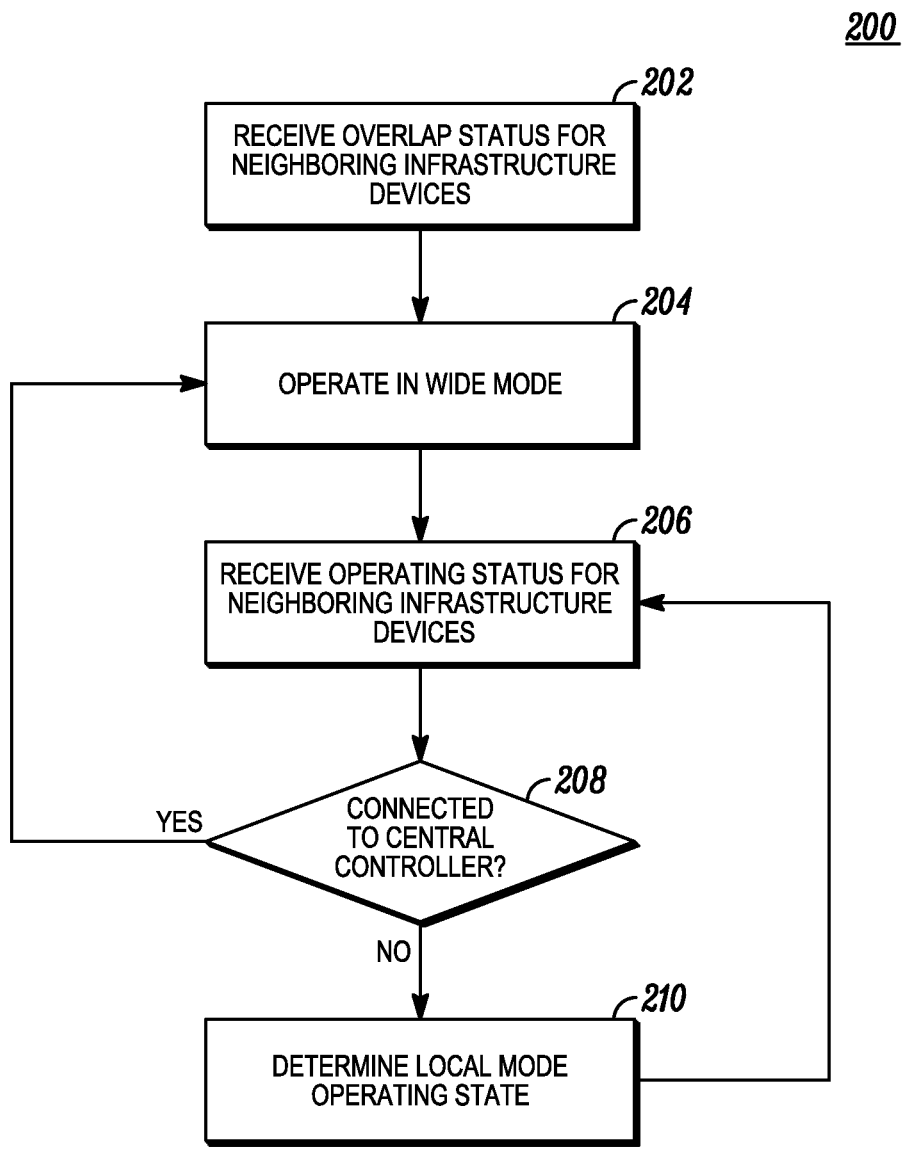
FIG. 2 is a flowchart of a method for dynamically determining the scope of services for a base station operating in local mode.

Referring to FIG. 2, illustrated therein is a flowchart of a method 200 for dynamically determining the scope of services for an infrastructure device operating in local mode. In operation, an infrastructure device (e.g., 106) receives, from the central controller, the overlap status for each of its neighboring infrastructure devices (202). The overlap status remains relatively static unless additional sites are added to the system. In another embodiment, the infrastructure device receives the overlap status directly from the neighboring infrastructure device.

While the infrastructure device is connected to the central controller, the infrastructure device operates in a wide mode (204). During the wide mode of operation, the infrastructure device offers all normal call services of which it is capable of supporting. While operating in the wide mode, and at periodic intervals, the infrastructure device receives (206) operating status or operating mode updates for its neighboring infrastructure devices. In an embodiment, an infrastructure device receives the updates of the operating status of its neighboring infrastructure devices on a separate link than the link to the central controller. In this manner, the infrastructure device can receive these updates and optimally select its local mode operating state regardless of its current connectivity to the central controller. For example, any low capacity dial-up link between neighboring infrastructure devices would suffice.

On receiving the overlap status and the operating mode for the neighboring infrastructure device, the infrastructure device updates a database, as illustrated by TABLE 1.

TABLE 1

| Infrastructure Device Identifier | Operating Mode Identifier | Overlap Status |
|---|---|---|
| 102 | Wide | No overlap |
| 118 | Wide | No overlap |
| 110 | Wide | Complete |
| 114 | Local | No overlap |
| 134 | Local | Partial |

TABLE 1 shows an example database maintained at an infrastructure device 106. TABLE 1 includes in an Infrastructure Device Identifier field, an identifier (102, 118, 110, 114, and 134) to identify the neighboring infrastructure devices to the infrastructure device 106. TABLE 1 further includes in an Operating Mode Identifier field, an ID (wide, local) to identify the current operating mode of each of the neighboring infrastructure devices, which is periodically updated. TABLE 1 also includes an overlap status field to identify a degree of overlap in coverage area between the infrastructure device 106, and each of the neighboring infrastructure devices. TABLE 2 provides an illustrative relation between the degree of overlap and overlap status. However, this relation can be defined in any suitable manner and using any desirable percentages of overlap to define the overlap status ranges.

TABLE 2

| Degree of Overlap | Overlap Status |
|---|---|
| 95 to 100 | Complete |
| 11 to 94 | Partial |
| <10 | No Overlap |

Based on the overlap status, the infrastructure device determines a cumulative degree of overlap for the infrastructure device, wherein cumulative degree of overlap is defined as the sum of the degree of overlap in network coverage area between the infrastructure device and each of its neighboring infrastructure devices.

Referring back to FIG. 2, at periodic intervals, the infrastructure device determines if it is connected to the central controller (208). If the infrastructure device is connected to the central controller, the infrastructure device continues to operate in wide mode and continues to receive (206) operating status of its neighboring infrastructure devices. If the infrastructure devices has lost connectivity to the central controller, the infrastructure device switches to a local mode of operation, and a local mode operating state is determined (210) in accordance with the teachings of the disclosure herein. Moreover, while the infrastructure device is operating in local mode, it continues to receive (206) operating status of its neighboring infrastructure devices and also continues to check (208) its link to the central control to determine whether has become reconnected to the central controller.

When the infrastructure device is operating in local mode, the infrastructure device uses logic to select a local mode operating state from a plurality of local mode operating states. The logic may be as simple or sophisticated as desired and depends, in part, on the number of neighboring infrastructure devices. For example, in one illustrative system implementation, infrastructure device 106 has up to thirty-two neighboring infrastructure devices.

Turning back to the logic used to select a local mode operating state. In one simple illustrative example, the infrastructure device selects between two local mode operating states (1. offering call service, and 2. switching to dormant mode where no call services are offered) using a database and some simple decision logic, as illustrated by reference to Table 3 and the example decision scenarios described below.

TABLE 3

| Neighboring Infrastructure Device Identifier | Operating Mode | Overlap Status | Best Infrastructure Device |
|---|---|---|---|
| 118 | Wide | Partial | No |
| 126 | Wide | Partial | No |
| 130 | Wide | Partial | No |
| 134 | Local | Partial | No |
| 106 | Local | Partial | No |
| 110 | Local | Partial | No |
| 114 | Wide | No Overlap | No |

TABLE 3 shows an example database maintained at an infrastructure device (e.g., device 106). TABLE 3 includes in a "Neighboring Infrastructure Device Identifier" field, an identifier (ID) used to uniquely identify a number of neighboring infrastructure devices. TABLE 3 further includes in an operating mode field, an identifier (wide, local) to identify the operating mode of the neighboring infrastructure device. The Overlap status field stores an ID (Complete, Partial, No overlap) to identify the overlap status with the neighboring infrastructure device. Further based on the overlap status, the infrastructure device determines the cumulative degree of overlap for the infrastructure device. Although not shown, Table 3 may further include the local mode operating state in which a neighboring device is operating. The infrastructure device can then use as input to its logic all of the available information and select a local mode operating state based on current traffic load and based on coverage currently being offered in its area. This dynamic methodology of an infrastructure device determining it local mode operating state provide benefits in that the coverage that it provides is based on the current conditions within the network.

Next described is some very simple logic that an infrastructure device might use to select (210) a local mode operating state if it becomes communicatively disconnected from the central controller, wherein it is unable to send/receive information to/from the central controller. If the cumulative degree of overlap for the infrastructure device exceeds a threshold value, the infrastructure device determines the "best" infrastructure device to offer services in the network coverage area of the infrastructure device. The threshold value is a value at which the overlap reaches a level above which it influences behavior in terms of base site reception for the mobile or portable radios in that area. For example, the threshold may be determined by exceeding a minimum useable field strength predicted in the overlap area for cell reception as defined by the mobile receiver by either its own settings or by those from the network. An illustrative threshold value is one that enables reception to be10 dB above the noise floor, or higher.

The best infrastructure device is determined based on overlap status, and in one embodiment, also based on operating mode of the neighboring infrastructure devices. The field "best infrastructure device identifier" identifies if the neighboring infrastructure device is the best infrastructure device to offer call services in the network coverage area of the infrastructure device 106. If none of the neighboring infrastructure devices is the best infrastructure device, then the infrastructure device 106 decides to offer call services in the local mode of operation. For example, looking at FIG. 1 momentarily Infrastructure device 118 might be deemed the best infrastructure device for its coverage area among its neighboring infrastructure devices 122, 110, 102, 126 because there is a fairly large coverage area that is only covered by infrastructure device 118, wherein there is no overlapping area. By contrast, infrastructure device 106 is not the best infrastructure device for its coverage area because its coverage area is geographically located completely within the coverage area of infrastructure device 110.

In another decision scenario, the cumulative degree of overlap for the infrastructure device does not exceed the threshold value, and the infrastructure device determines that there is no neighboring infrastructure device that is the best infrastructure device for its coverage area. In such a scenario, the infrastructure device offers services in the local mode.

In another decision scenario, all of the neighboring infrastructure devices are operating in the wide mode, and the cumulative degree of overlap exceeds the threshold value. In this case, the infrastructure device switches to the dormant mode.

In another decision scenario, the infrastructure device offers call service when: all of the neighboring infrastructure devices are operating in the local mode and offering call service; the cumulative degree of overlap exceeds the threshold value; and the infrastructure device is the best infrastructure device for the network coverage area. If the infrastructure device is not the best infrastructure device for the network coverage area, the infrastructure device switches to dormant mode of operation.

In another decision scenario, the infrastructure device offers call service when all of the neighboring infrastructure devices are operating in the local mode and offering call service, and the cumulative degree of overlap does not exceeds the threshold value.

In the description herein, only two neighboring infrastructure device operating scenarios have been defined: when all neighboring infrastructure devices are in wide mode; and when all neighboring infrastructure devices are in local mode for clarity of illustration. However in operation, different infrastructure devices will be in different modes at any instance in time, e.g., some will be in wide mode, some in local mode, some in dormant mode, etc. Thus, many variations of the teachings herein can be implements to enable an infrastructure device to optimally select one of multiple local operating mode states.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for determining scope of services for an infrastructure device operating in a multi-site communication system having a central controller coupled to a plurality of sites, the method comprising:
    at the infrastructure device:
        receiving an overlap status for at least one neighboring infrastructure device, which indicates an amount of overlap in coverage area between the infrastructure device and the at least one neighboring infrastructure device;
        detecting that the infrastructure device has switched from a wide mode of operation, wherein the infrastructure device is communicatively connected to the central controller, to a local mode of operation, wherein the infrastructure device is communicatively disconnected from the central controller, and
        selecting one of a plurality of local mode operating states, based on the received overlap status, to determine scope of services for the infrastructure device while in the local mode of operation.

2. The method of claim 1 further comprising:
    for each of the at least one neighboring infrastructure device, receiving an indication of whether the neighboring infrastructure device is operating in the wide mode or the local mode including the local mode operating state if the neighboring infrastructure device is operating in the local mode, wherein selecting one of the plurality of local mode operating states is further based on the mode of operation of the at least one neighboring infrastructure device.

3. The method of claim 2 further comprising:
    determining a cumulative degree of overlap based on the overlap status for the at least one neighboring infrastructure device, wherein selecting one of the plurality of local mode operating states is based on the cumulative degree of overlap.

4. The method of claim 3, wherein the plurality of local mode operating states comprises:
    offering call service; and
    switching to a dormant mode where no call services are offered.

5. The method of claim 4 further comprising selecting the dormant mode when all of the neighboring infrastructure devices, having overlapping coverage area with the infrastructure device, are operating in the wide mode, and the cumulative degree of overlap exceeds a threshold value.

6. The method of claim 4 further comprising selecting the dormant mode when all of the neighboring infrastructure devices, having overlapping coverage area with the infrastructure device, are operating in the local mode and offering call service, and the cumulative degree of overlap exceeds a threshold value.

7. The method of claim 4 further comprising selecting offering call service when all of the neighboring infrastructure devices, having overlapping coverage area with the infrastructure device, are operating in the local mode, and the cumulative degree of overlap exceeds a threshold value.

8. The method of claim 2, wherein the indication of whether each of the at least one neighboring infrastructure device is operating in the wide mode or the local mode is received from the central controller.

9. The method of claim 2, wherein the indication of whether each of the at least one neighboring infrastructure device is operating in the wide mode or the local mode is received from the at least one neighboring infrastructure device.

10. The method of claim 1 further comprising directly communicating the selected local mode operating state to the at least one neighboring infrastructure device.

11. An infrastructure device in a multi-site communication system having a central controller coupled to a plurality of sites, the infrastructure device comprising:
    a first interface coupled to the central controller and receiving an overlap status for at least one neighboring infrastructure device, which indicates an amount of overlap in coverage area between the infrastructure device and the at least one neighboring infrastructure device;
    a second interface coupled to the at least one neighboring infrastructure device and receiving an indication of whether each of the at least one neighboring infrastructure devices is operating in a wide mode of operation, wherein the neighboring infrastructure device is communicatively connected to the central controller, or a local mode of operation, wherein the neighboring infrastructure device is communicatively disconnected from the controller, including receiving an indication of a local mode operating state if the neighboring infrastructure device is operating in the local mode; and
    a processor coupled to the first and second interfaces for:
        detecting that the infrastructure device has switched from the wide mode of operation to the local mode of operation; and
        selecting one of a plurality of local mode operating states, based on the received overlap status and on the mode of operation of the at least one neighboring infrastructure device, to determine the scope of services for the infrastructure device while in the local mode of operation.

* * * * *